United States Patent [19]

Sakai et al.

[11] Patent Number: 4,688,914
[45] Date of Patent: Aug. 25, 1987

[54] CAMERA SYSTEM

[75] Inventors: Shinji Sakai, Tokyo; Takashi Kawabata, Kamakura, both of Japan

[73] Assignee: Canon Kabushiki Kaisha, Tokyo, Japan

[21] Appl. No.: 917,248

[22] Filed: Oct. 8, 1986

Related U.S. Application Data

[63] Continuation of Ser. No. 692,335, Jan. 17, 1985, abandoned, which is a continuation of Ser. No. 499,550, May 31, 1983, abandoned.

[30] Foreign Application Priority Data

Jun. 3, 1982 [JP] Japan .................................. 57-94099

[51] Int. Cl.$^4$ ................................................ G03B 1/18
[52] U.S. Cl. .................................. 354/173.11; 354/412
[58] Field of Search ................ 354/173.1, 173.11, 400, 354/402, 412, 413, 204, 206, 403

[56] References Cited

U.S. PATENT DOCUMENTS

| | | | |
|---|---|---|---|
| 3,852,779 | 12/1974 | Yamamichi et al. | 354/173.1 |
| 4,175,845 | 11/1979 | Iwashita et al. | 354/173.1 |
| 4,182,557 | 1/1980 | Date et al. | 354/173.1 |
| 4,435,058 | 3/1984 | Yoshida et al. | 354/173.1 |
| 4,461,544 | 7/1984 | Isobe et al. | 354/400 |
| 4,464,037 | 8/1984 | Terui et al. | 354/400 |

Primary Examiner—L. T. Hix
Assistant Examiner—David M. Gray
Attorney, Agent, or Firm—Fitzpatrick, Cella, Harper & Scinto

[57] ABSTRACT

A camera system includes an autofocus camera having a continous phototaking mode and single phototaking mode, a motor drive having high and low wind up speeds, and circuitry which prohibits the autofocus operation when both the motor drive is in the high speed mode and the camera is in the continuous phototaking mode.

9 Claims, 7 Drawing Figures

CAMERA SYSTEM

This application is a continuation of application Ser. No. 692,335 filed Jan. 17, 1985, now abandoned, which is a continuation of Ser. No. 499,550, filed May 31, 1983, now abandoned.

BACKGROUND OF THE INVENTION

1. Field of the Invention

This invention relates to improvements in a camera system comprising a camera provided with an auto focus control device and an auto winding up driving device capable of selecting a plurality of types of winding up operations.

2. Description of the Prior Art

Some of the conventional auto winding up driving devices are capable of selecting the winding up speed to a high speed or a low speed or selecting one-frame photography or continuous photography, and such selection is effected independently of the condition of the camera side. Accordingly, in a shutter speed priority auto exposure camera, if the winding up speed is too high, the winding up of the motor drive becomes higher in speed than the sequence of metering of auto exposure→operation→aperture control→shutter release and the winding up takes place before auto exposure is completed, and thus shutter release is effected.

To overcome such disadvantage, a technique whereby during the operation of the motor drive, metering operation is effected only for the first frame of the release, and the metering value is stored and the exposure is adjusted to the first frame of the motor drive photography and auto exposure is not effected for the second and subsequent frames is disclosed in U.S. Pat. No. 3,852,779.

Also, a technique provided with photographing mode change-over means for effecting auto exposure operation in the case of low-speed auto winding up continuous photography and rendering aperture operation and mirror operation inoperative in the case of high-speed auto winding up continuous photography, and inhibiting means for inhibiting the return of the operating mechanism for aperture operation and mirror operation operated for the first frame after the starting of the release operation during high-speed continuous photography is known from U.S. Pat. No. 4,182,557.

However, a technique is not known which eliminates the disadvantage that when an auto winding up device (motor drive) is mounted in a camera provided with an auto focus apparatus and auto focus photography is to be effected, the auto focus operation is slower than the high-speed winding up operation and therefore, even if the auto focus operation is effected, release takes place before the operation is completed and thus, the auto focus operation is often useless.

SUMMARY OF THE INVENTION

It is an object of the present invention to solve the above-noted problems and to provide a camera system which can eliminate the wasteful auto focus control operation in the case of the auto winding up.

The invention will become fully apparent from the following detailed description thereof taken in conjunction with the accompanying drawings.

DESCRIPTION OF THE PREFERRED EMBODIMENTS

Figure 1:
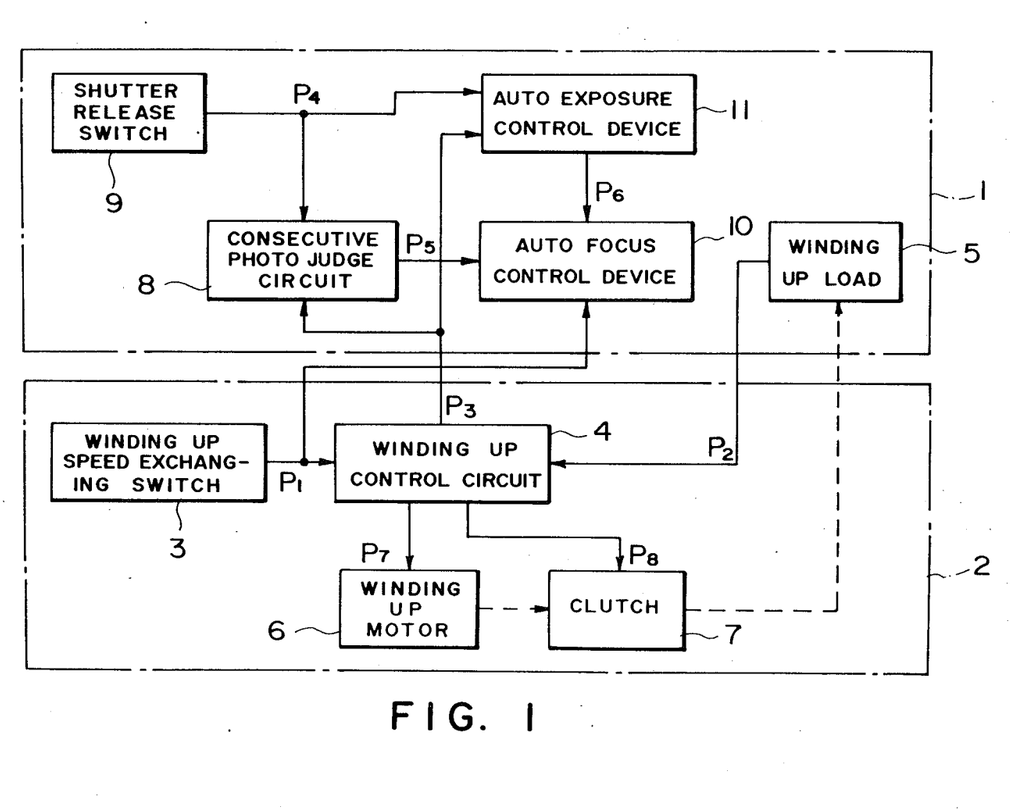
FIG. 1 is a block diagram showing an embodiment of the present invention.

FIG. 1 shows an embodiment of the present invention. An auto winding up driving device 2 is mounted on a camera 1. The auto winding up driving device 2 is only capable of selecting a high speed and a low speed, and a winding up speed change-over switch 3 puts out to a winding up control circuit 4 a high level speed command signal $P_1$ at the high speed and a low level speed command signal $P_1$ at the low speed. The winding up control circuit 4 controls a winding up motor 6 and a clutch 7 in response to the speed command signal $P_1$ and the uncompleted winding up signal $P_2$ from a winding up load 5, and puts out a release possibility signal $P_3$ to the camera 1 side.

A consecutive photo judge circuit 8 provided on the camera 1 side judges whether photography is consecutive photo or not by the release signal $P_4$ from a shutter release swich 9 and the release possibility signal $P_3$ from the winding up control circuit 4, and puts out a consecutive photo signal $P_5$ to an auto control device 10. The auto focus control device 10 locks the auto focus control operation and fixes the position of the lens when the consecutive photo signal $P_5$ and the high level speed command signal $P_1$ are input thereto at a time. An auto exposure control device 11 effects the auto exposure control operation and puts out a lock command signal $P_6$ to the auto focus control device 10 to thereby lock the auto focus control operation during shutter release when the release possibility signal $P_3$ and the release signal $P_4$ are input thereto at a time.

Figure 2:
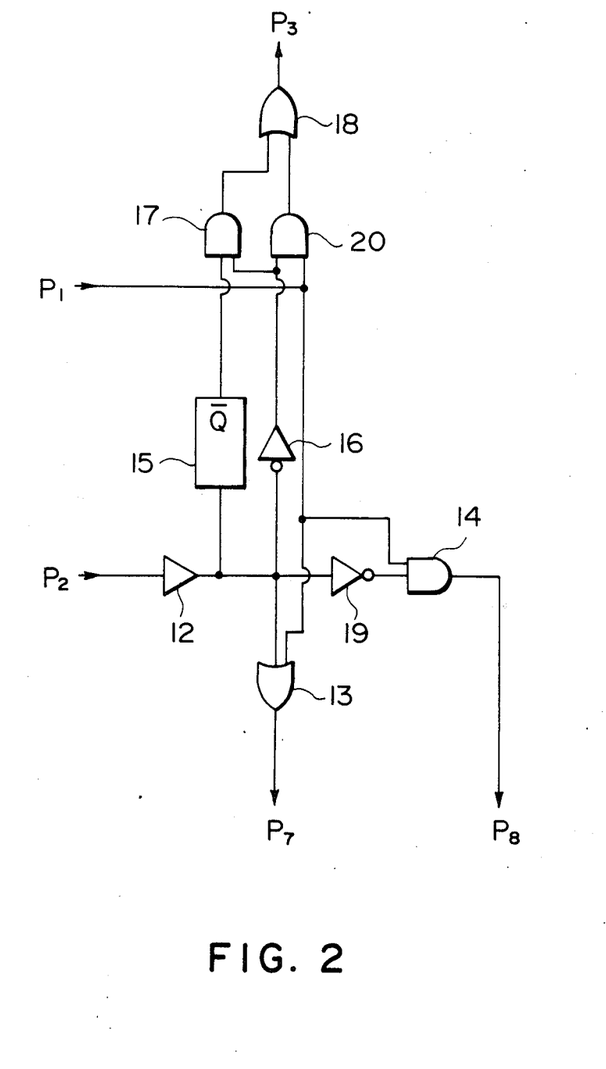
FIG. 2 is a circuit diagram showing an example of the winding up control circuit.

FIG. 2 shows an example of the winding up control circuit 4. Where the low winding up speed is selected and the speed command signal $P_1$ from the winding up speed change-over switch 3 is of a low level, when photography is completed and the uncompleted winding up signal $P_2$ from the winding up load 5 is inverted to a high level, it is imparted as a motor driving signal $P_7$ to the winding up motor 6 via a buffer 12 and an OR gate 13 and the winding up motor 6 winds up the winding up load 5 by an amount corresponding to one frame of the film through the clutch 7. At this time, the output of an AND gate 14 is at a low level and therefore, the clutch 7 is engaged. The winding up load 5 includes a film winding up mechanism and in addition, a shutter charge mechanism, a mirror reset mechanism, etc.

When winding up is completed, the uncompleted winding up signal $P_2$ changes to a low level and therefore, a down edge operation type monostable multivibrator 15 puts out a low level signal from its output terminal $\overline{Q}$ for a predetermined time, whereafter it puts out a high level signal. By this signal and the output of an inverter 16, an AND gate 17 puts out a high level release possibility signal $P_3$ via an OR gate 18. Delaying the release possibility signal $P_3$ by the monostable multivibrator 15 putting out a low level signal for a predetermined time is for the purpose of eliminating the influence of the inertia when the winding up motor 6 is stopped.

Where the high winding up speed is selected and the speed command signal $P_1$ from the winding up speed change-over switch 3 is of a high level, this speed command signal $P_1$ is normally put out as a motor driving signal $P_7$ via the OR gate 13 and the winding up motor 6 always continues to rotate. When winding up is completed, the uncompleted winding up signal $P_2$ assumes a low level and therefore, the output of an inverter 19 assumes a high level and the AND gate 14 puts out a high level clutch disengage signal $P_8$ to disengage the clutch 7 and thereby stop the winding up. Thereby, the influence of the inertia during the stoppage of the starting of the winding up motor 6 is eliminated to make quick consecutive photo possible.

When the uncompleted winding up signal $P_2$ is changed to a low level by completion of winding up, the output of an AND gate 20 immediately assumes a high level and is supplied as a release possibility signal $P_3$ to the camera 1 side from an OR gate 18.

The winding up motor is, for example, the motor M shown in FIG. 3 of U.S. Pat. No. 4,175,845, the terminal which puts out the motor driving signal $P_7$ of the winding up control circuit 4 is connected to the base of the transistor Tr 103 of U.S. Pat. No. 4,175,845 and the terminal which puts out the clutch disengage signal $P_8$ is connected to the base of the transister Tr 102 of U.S. Pat. No. 4,175,845. The terminal to which the uncompleted winding up signal $P_2$ is input is connected to a terminal which puts out a signal inverted through an inverter to a terminal $P_3'$ combining the motor control circuit 202 and the motor driven camera 201. The terminal to which the speed command signal $P_1$ is input is connected to the fixed contact side of a switch whose movable contact is changed over to the power source side of a resistor connected between the power source and the ground in response to said resistor and the switch SW11 when in "H" position and changed over to the ground side of said resistor when in "L" position and "S" position. The uncompleted winding up signal $P_2$ of the winding up load 5 is, for example, the signal put out to the terminal $P_3$ connected to the switch SW5 of U.S. Pat. No. 4,175,845.

Figure 3:
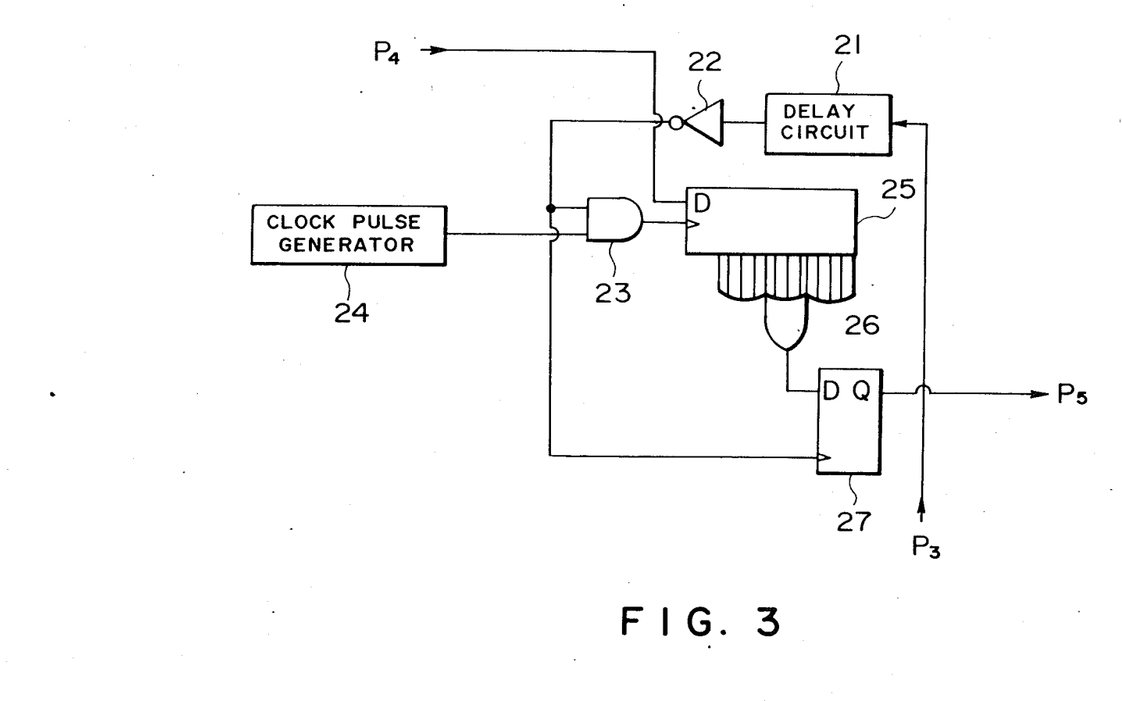
FIG. 3 is a circuit diagram showing an example of the consecutive photo judge circuit.

FIG. 3 shows an example of the consecutive photo judge circuit 8 which discriminates between the single and the continuous phototaking modes. The release possibility signal $P_3$ is delayed by a delay circuit 21, is level-inverted by an inverter 22 and is converted into a signal which assumes a high level during winding up and till a time slightly later than the completion of winding up. An AND gate 23 is opened by this signal and the clock pulse of a clock pulse generator 24 is input to a shift register 25. If, at this time, the release signal $P_4$ is not input to the shift register 25, that is, if consecutive photo is not effected, all outputs of the shift resister 25 are zero and the outputs of an OR gate 26 and D-flip-flop 27 also are zero.

If the release signal $P_4$ is input to the shift register 25 when the AND gate 23 is opened and the clock pulse is input to the shift resister 25, that is, if consecutive photo is effected, the shift register 25 supplies a high level signal to the input terminal D of the D-flip-flop 27 via the OR gate 26 and therefore, the D-flip-flop 27 puts out a high level consecutive photo signal $P_5$. In this circuit, the consecutive photo signal $P_5$ can be reliably put out even if there is more or less chattering in the shutter release switch 9 before and after the completion of winding up.

The shutter release switch 9 which puts out the release signal $P_4$ is designed so as to put out an H-level signal as the release signal $P_4$ when the second stroke of the shutter button is started.

Figure 4:
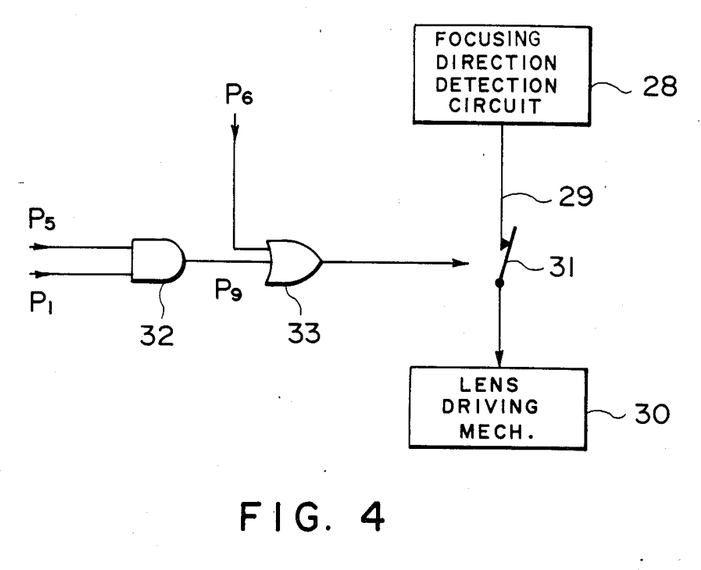
FIG. 4 shows the construction of an example of the auto focus control device.

FIG. 4 shows an example of the auto focus control device. A focusing direction detection circuit 28 supplies a control signal corresponding to the focusing direction to a lens driving mechanism 30 through a control line 29. The lens driving mechanism 30 includes a motor, moves the lens axially outwardly or axially inwardly by a control signal and positions the lens at its focus. An auto focus lock switch 31 is provided in the control line 29.

When the high level speed command signal $P_1$ during selection of the high speed and the consecutive photo signal $P_5$ are input to an AND gate 32 at a time, the AND gate 32 supplies a high level lock command signal $P_9$ to the auto focus lock switch 31 via an OR gate 33 and opens this switch. Accordingly, the position of the lens is not moved thereafter and the lens becomes locked. The auto focus lock switch 31 is opened by the lock command signal $P_6$ from the auto exposure control circuit 11 even during shutter release.

In the embodiment illustrated, the AND gate 32 corresponds to the lock command signal producing means of the present invention, and the auto focus lock switch 31 corresponds to the auto focus lock means. Together, gate 32 and switch 31 function as a means to prohibit auto-focus operation, specifically, in the illustrated embodiment, by preventing actuation of the lens driving mechanism 30.

The release signal $P_4$ instead of the consecutive photo signal $P_5$ may be input to the AND gate 32. In such case, the auto focus lock will immediately be released even after completion of winding up if the shutter release button is released in the course of consecutive photo.

Figure 5:
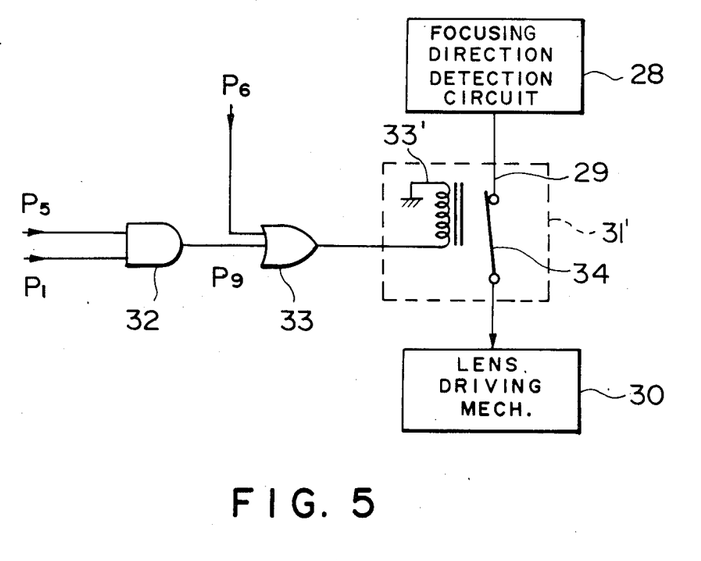
FIG. 5 is a circuit diagram of the auto focus lock switch of the auto focus control device shown in FIG. 4.

FIG. 5 is a circuit diagram of the auto focus lock switch 31 of the auto focus control circuit 10 shown in FIG. 4. Designated by 31' is an auto focus lock switch relay comprising a relay coil 33' and a normally closed switch 34. When an H-level signal is put out from the OR gate 33, the relay coil 33' is electrically energized to open the switch 34 and thus, the lens driving mechanism 30 stops operating.

Figure 6:
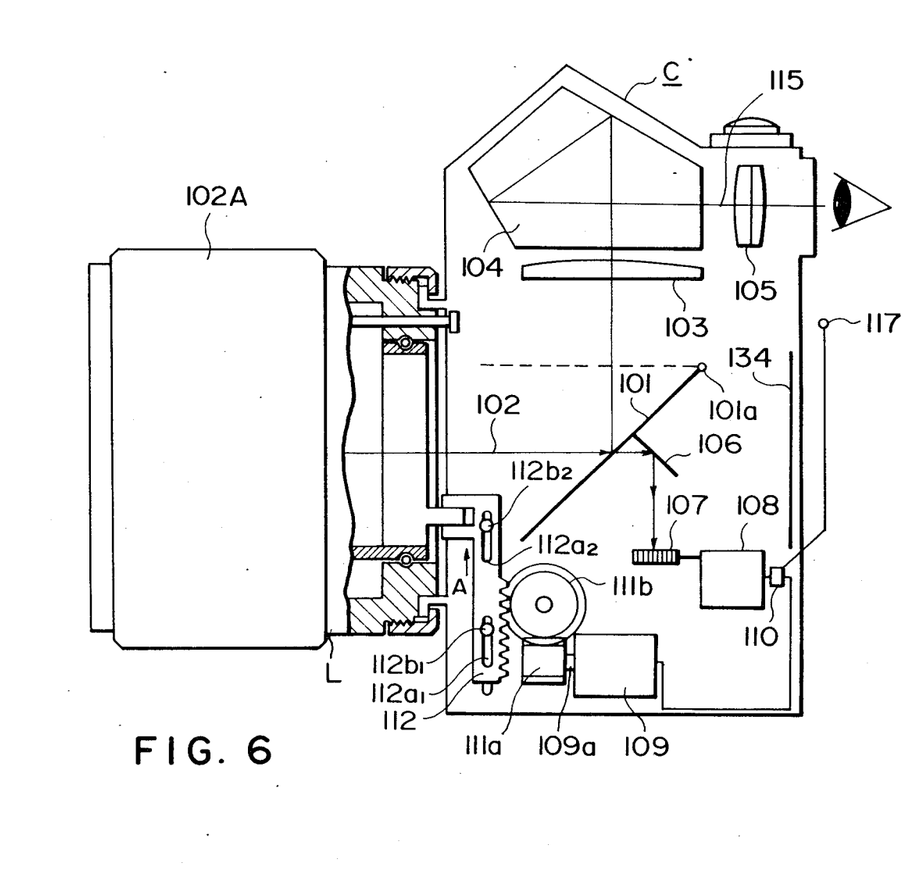
FIG. 6 is a cross-sectional view showing a second embodiment of the auto focus control device.

FIG. 6 is a cross-sectional view showing a second embodiment of the auto focus control device. In FIG. 6, the motor driving device is omitted and only the construction of the auto focus control device is shown. This Figure shows an example in which an auto focusing device and a driving device driven by the output thereof are disposed within the camera body C and an operatively associated member in the lens barrel L is operated to operate the focusing optical system.

In FIG. 6, the lens barrel L is shown as an interchangeable lens barrel removably mountable on the camera body C.

Reference numeral 101 designates a half-transmitting mirror for directing to the finder optical path the object light 102 passed through the picture-taking lens 102A, not shown, in the lens barrel L. This picture-taking lens is described in the copending U.S. application Ser. No. 326,289, filed Dec. 1, 1981. The mirror 101 is supported for rotation about a shaft 101a. The finder optical path is of a conventional construction comprising a condenser lens 103, a pentaprism 104, an eye-piece 105, etc. Designated by 106 is a sub-mirror held by the mirror 101 to direct to a line sensor 107 and a focus detecting device 108 part of the object light passed through the mirror 101. Denoted by 108 is a focus detecting device which receives the image of an object formed by an image forming lens by a photosensor array 107 comprising a number of charge accumulating type or charge accumulating and discharging type photosensors and time-serially extracts the output of each photosensor, thereby electrically scanning the object image and suitably processing the the scanning output, thus effecting focus detection and driving a motor 109 to be described which drives the lens. Reference numeral 109 designates a motor driven by the focus detecting circuit 108. Reference numeral 110 denotes a relay similar in construction to the relay switch 32 driven by the signal of the OR gate 33 shown in FIG. 5.

The rotational output of the motor shaft 109a of the motor 109 is transmitted to a driving member 112 through the gear trains 111a and 111b of gear 111. The slots 112a$_1$, 112a$_2$ and pins 112b$_2$, 112b$_2$ of the driving member 112 are means for holding the driving member 112 in a predetermined direction.

Description will now be made of the operation of the embodiment of the auto focus control device shown in FIG. 6. A winding up operation incongruous to the auto focusing operation is not selected and as a result, the output signal of the OR gate 33 shown in FIG. 5 is of a low level and the relay 110 is energized and therefore, the output of the focus detecting circuit 108 is applied to the motor 109 to rotate the same, which in turn drives the driving member 112 through the motor shaft 109a and the gear trains 111a, 111b and thus, the lens 102A effects focusing operation. When a winding up operation incongruous to the auto focusing operation is selected and the output signal of the OR gate 33 shown in FIG. 5 is of a high level and the relay is deenergized, the output of the focus detecting circuit 108 is not applied to the motor 109, so that the motor 109 does not rotate and the auto focusing operation is locked.

Figure 7:
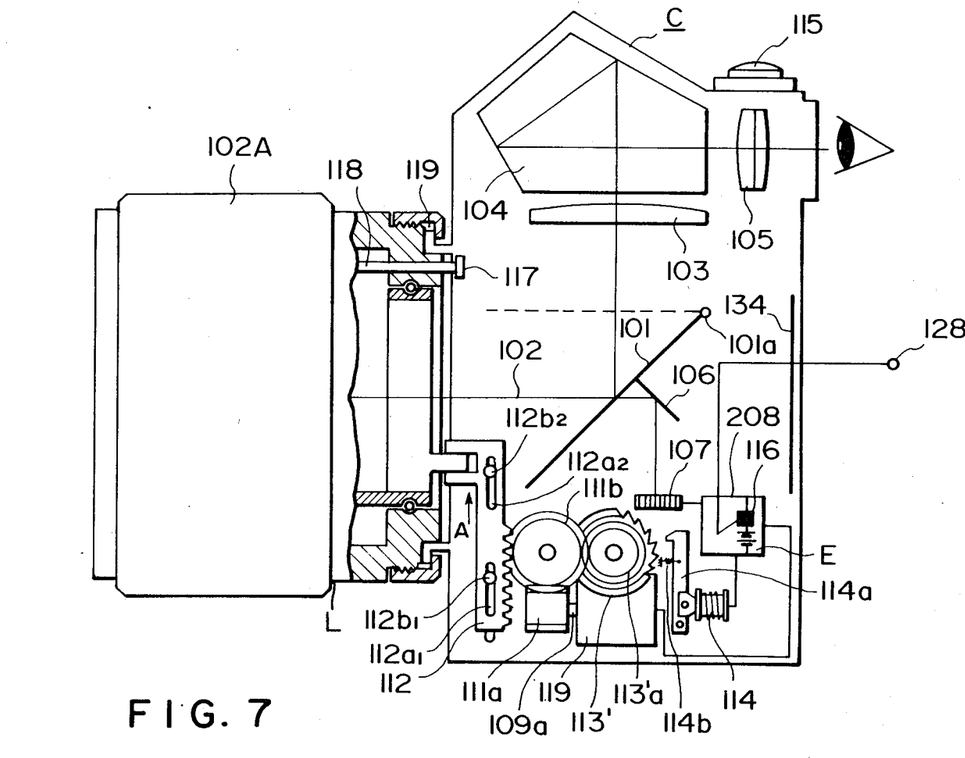
FIG. 7 is a cross-sectional view showing a third embodiment of the auto focus control device.

FIG. 7 is a cross-sectional view showing a third embodiment of the auto focus control device. In FIG. 7, the motor drive device is omitted and only the construction of the auto focus control device is shown. In FIG. 7, parts similar in function to those of FIG. 6 are given similar reference characters and need not be described. In FIG. 7, reference numeral 116 designates a normally closed relay switch adapted to be opened when the terminal 128 of a power source E for driving a coil 114 is at a high level. A ratchet wheel 113' has a toothed portion 113'a capable of meshing with a part of gear trains 111a, 111b and, when the relay switch 116 is open, that is , when the coil 114 is not energized, a movable pawl 114a biased by a spring 114b is engaged with the ratchet wheel to prevent rotation of the latter. A terminal 128 is one for applying the signal of the OR gate 33 shown in FIG. 5.

Description will now be made of the operation of the embodiment of the auto focus control device shown in FIG. 7.

A winding up operation incongruous to the auto focusing operation is not selected and as a result, the output signal of the OR gate 33 shown in FIG. 5 is of a low level and the relay 116 is energized, so that the coil 114 is energized. Therefore, the movable pawl 114a is attracted to the coil and the ratchet wheel 113 is not restrained. As a result, auto focusing operation is effected.

When a winding up operation incongruous to the auto focusing operation is selected and the output signal of the OR gate 33 shown in FIG. 5 is of a high level and the relay 116 is deenergized, the coil 114 is not energized and the movable pawl 114a is pulled by the spring 114b and engaged with the ratchet wheel 113 and, even if the motor 109 is supplied with power, the gear trains 114a, 111b are in their restrained condition and therefore, the driving member 112 is restrained and the auto focusing operation is locked.

In an auto winding up driving device wherein change-over between one-frame photography and continuous photography can be effected, the consecutive photo judge circuit 8 may be omitted if design is made such that a consecutive photo signal is produced in response to the change-over to continuous photography.

The AND gate 32 and the auto focus lock switch 31 may also be provided outside the auto focus control device 10.

According to the present invention, as described above, there are provided lock command signal producing means which produces a lock command signal when a winding up operation incongruous to the auto focus control operation is selected and auto focus lock means for fixing the position of the lens by the inputting of the lock command signal and therefore, the useless auto focus control operation in the case of the auto winding up can be eliminated.

What we claim is:

1. A camera system comprising:
  (a) a camera including an optical system and having a continuous phototaking mode to automatically and continuously take pictures and a single phototaking mode;
  (b) a motor drive means having a first mode in which a wind-up speed for winding up a film is slow and a second mode in which the wind-up speed is fast;
  (c) a wind-up speed changing switch for outputting a first signal and second signal, said first signal indicating that the wind-up speed is slow, and said second signal indicating that the wind-up speed is fast;
  (d) an auto-focusing device for focusing said optical system of said camera; and
  (e) prohibition means for always prohibiting the operation of said auto-focusing device when said second signal from said wind-up speed changing switch is detected while said camera is in said continuous phototaking mode.

2. A camera system according to claim 1, wherein said auto-focusing device comprises:
  a circuit for detecting the focus adjusting state of said optical system; and
  means for driving said optical system by the output signal from said circuit.

3. A camera system according to claim 2, wherein said prohibition means locks the operation of said auto-focusing device so that said auto-focusing device is not driven.

4. A camera comprising:
  (a) a camera including an optical system and having a continuous phototaking mode to automatically and continuously take pictures and a single phototaking mode;

(b) photo judge means for judging whether the operation of said camera is in said continuous phototaking mode, or said single phototaking mode;

(c) a motor drive means having a first mode in which a wind-up speed for winding up a film is slow and a second mode in which the wind-up speed is fast;

(d) a wind-up speed changing switch for outputting a first signal and second signal, said first signal indicating that the wind-up speed is slow, and said second signal indicating that the wind-up speed is fast;

(e) an auto-focusing device for focusing said optical system of said camera; and (f) prohibition means for always prohibiting the operation of said auto-focusing device when said second signal from said wind-up speed changing switch is detected while said camera is in said continuous phototaking mode and executing the operation of said auto-focusing device when said first signal from said wind-up speed changing is detected while said camera is in said continuous phototaking mode.

5. A camera system according to claim 4, wherein said auto-focusing device comprises:

a circuit for detecting the focus adjusting state of said optical system; and means for driving said optical system by the output signal from said circuit.

6. A camera system comprising:

(a) a camera including an optical system and having a continuous phototaking mode to automatically and continuously take pictures and a single phototaking mode;

(b) a motor drive means having a first mode in which a wind-up speed for winding up a film is slow and a second mode in which the wind-up speed is fast;

(c) a wind-up speed changing switch for outputting a first signal and second signal, said first signal indicating that the wind-up speed is slow, and said second signal indicating that the wind-up speed is fast;

(d) an auto-focusing device for focusing said optical system of said camera, said device comprising
a circuit for detecting the focus adjusting state of said optical system, and
means for driving said optical system by the output signal from said circuit; and (e) prohibition means for always prohibiting the operation of said auto-focusing device when said second signal from said wind-up speed changing switch is detected while said camera is in said continuous phototaking mode, said prohibition means locking the operation of said auto-focusing device when said auto-focusing device is not driven.

7. A camera system comprising:

(a) a camera having an optical system and having a continuous phototaking mode;

(b) an auto-focusing device for focusing said optical system of said camera;

(c) wind-up speed changing means for changing a wind-up speed at which a film is wound up, said wind-up speed changing means outputting a first signal and a second signal, said first signal indicating a first mode in which the wind-up speed is slow, and said second signal indicating a second mode in which the wind-up speed is fast;

(d) completion detecting means for detecting the completion of a film wind-up;

(e) detecting means for detecting the continuous phototaking mode of said camera, said detecting means including,
  (A) first signal generating means for generating a signal for starting the phototaking operation of said camera, and
  (B) second signal generating means for detecting a completion signal from said completion detecting means and said first or second signal from said wind-up speed changing means to generate a signal,
  said continuous phototaking mode being detected by the detection of said signal from said first and second signal generating means; and (f) prohibition means for prohibiting the operation of said auto-focusing device, responsive to detection of said continuous phototaking mode and said second mode.

8. A camera system according to claim 7, wherein said auto-focusing device comprises:

a circuit for detecting the focus adjusting state of said optical system; and means for driving said optical system by the output signal from said circuit.

9. A camera system comprising:

(a) a camera having an optical system and having a continuous phototaking mode;

(b) an auto-focusing device for focusing said optical system of said camera, said device comprising,
a circuit for detecting the focus adjusting state of said optical system, and
means for driving said optical system by the output signal from said circuit;

(c) wind-up speed changing means for changing wind-up speed at which a film is wound up, said speed changing means outputting a first signal and a second signal, said first signal indicating a first mode in which the wind-up speed is slow, and said second second signal indicating a second mode in which the wind-up speed is fast;

(d) completion detecting means for detecting the completion of a film wind-up;

(e) detecting means for detecting the continuous phototaking mode of said camera, said detecting means including
  (A) first signal generating means for generating a signal for starting the phototaking operation of said camera, and
  (B) second signal generating means for detecting a completion signal from said completion detecting means and said first or second signal from said wind-up speed changing means to generate a signal,
  said continuous phototaking mode being detected by the detection of said signal from said first and second signal generating means; and (f) prohibition means for prohibiting the operation of said auto-focusing device, responsive to detection of said continuous phototaking mode and said second mode, said prohibition means locking the operation of said auto-focusing device so that said auto-focusing device is not driven.

* * * * *

UNITED STATES PATENT AND TRADEMARK OFFICE
CERTIFICATE OF CORRECTION

PATENT NO. : 4,688,914
DATED : August 25, 1987
INVENTOR(S) : SHINJI SAKAI, ET AL.

It is certified that error appears in the above-identified patent and that said Letters Patent is hereby corrected as shown below:

COLUMN 2

Line 37, "swich" should read --switch--.
Line 39, "auto control" should read --auto focus control--.

COLUMN 5

Line 16, "the the" should read --the then--.

COLUMN 6

Line 66, "4. A camera comprising:" should read
--4. A camera system comprising:--.

COLUMN 7

Line 22, "changing is" should read --changing switch is--.

UNITED STATES PATENT AND TRADEMARK OFFICE
CERTIFICATE OF CORRECTION

PATENT NO. : 4,688,914

DATED : August 25, 1987

INVENTOR(S) : SHINJI SAKAI, ET AL.

It is certified that error appears in the above-identified patent and that said Letters Patent is hereby corrected as shown below:

COLUMN 8

Line 43, "second second" should read --second--.

Signed and Sealed this

Twelfth Day of January, 1988

Attest:

DONALD J. QUIGG

*Attesting Officer*     *Commissioner of Patents and Trademarks*